July 11, 1933.   J. F. DUFFY   1,917,929

METHOD OF MOLDING A MOTOR MOUNTING PAD

Filed Oct. 29, 1928

Inventor
James Francis Duffy
By Liverance and Van Antwerp
Attorneys

Patented July 11, 1933

1,917,929

UNITED STATES PATENT OFFICE

JAMES FRANCIS DUFFY, OF HOLLAND, MICHIGAN, ASSIGNOR TO DUFFY MANUFACTURING COMPANY, OF HOLLAND, MICHIGAN, A CORPORATION OF MICHIGAN

METHOD OF MOLDING A MOTOR MOUNTING PAD

Application filed October 29, 1928. Serial No. 315,608.

This invention relates to a motor mounting pad in combination with an internal combustion engine and the chassis frame on which the engine is mounted. It has been common previously to place a solid rubber block or pad within a rigid holder which has usually been in the form of a cup having a shape which will snugly receive the block or pad of rubber. The rubber is retained against outward distortion by the sides of the cup and there is little or no beneficial effect had for the reason that the rubber becomes in effect the same as a solid block with substantially all of its qualities of resilience eliminated. If the rubber block or pad is used without any outside holding and retaining cup it flattens down and becomes permanently distorted and in a short time is of little or no value.

With my invention a pad is produced which is of rubber but within the same between the upper and lower sides thereof a plurality of flat plates of metal are located and embedded in the rubber, the plates having a plurality of openings therethrough so that the layers of rubber above, below and between the plates are securely connected and vulcanized together. A pad of this character is resilient, requires no outside retaining or holding cup and does not flatten down and lose its effectiveness.

An understanding of the invention and the construction embodying the same may be had from the following description taken in connection with the accompanying drawing, in which, Fig. 1 is a fragmentary section illustrative of the use of the motor mounting pad of my invention between the outwardly extending arms of the engine and the side members of the chassis frame.

Like reference characters refer to like parts in the different figures of the drawing.

Figure 1:
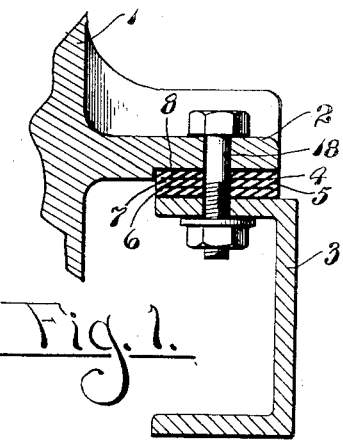
Figure 2:
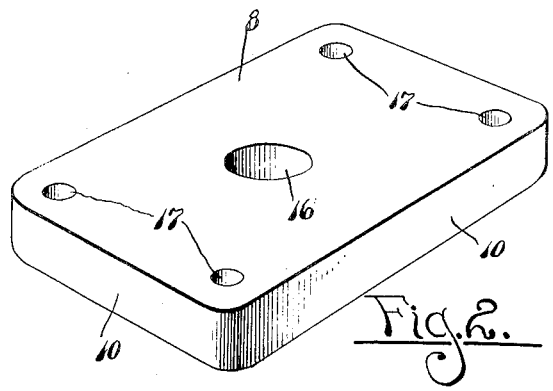
Fig. 2 is a perspective view of the pad of my invention.
Figure 3:
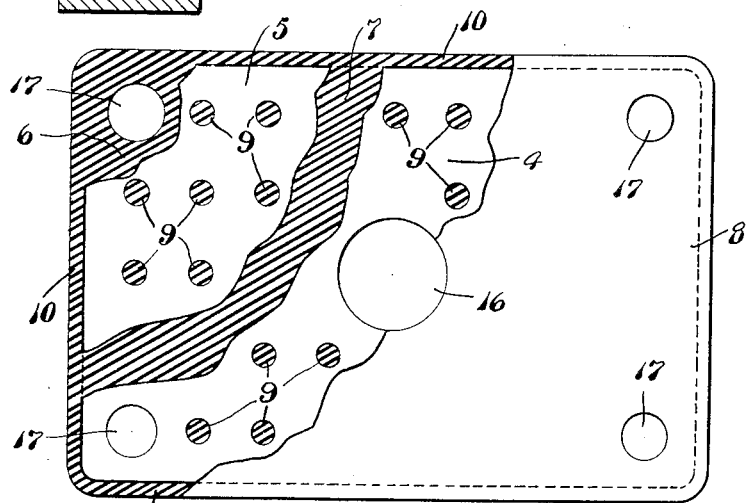
Fig. 3 is an enlarged plan of the pad with various parts broken away and shown in section to illustrate the construction of the pad.
Figure 4:
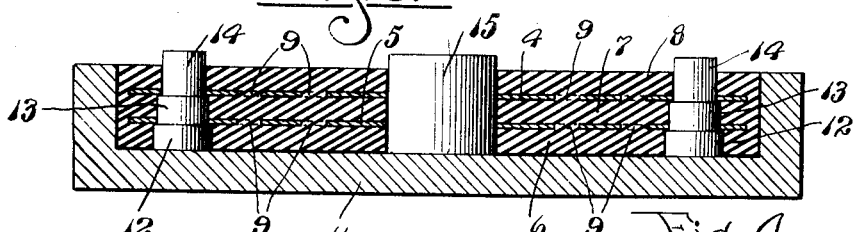
Fig. 4 is a vertical section through the mold in which the pad is made, a pad being shown located within the mold.

In Fig. 1 there is shown a fragmentary portion 1 of a motor vehicle engine and one of the laterally extending arms 2 which extend over the chassis side frame members 3 of the automobile in which the engine is to be installed. The pad of my invention is to be placed between the underside of the arm 2 and the upper side of the upper flange of the channel 3 which furnishes one of the side members of the chassis frame. The pad as shown includes two spaced apart flat metal plates 4 and 5 embedded in rubber, there being a layer or strata of rubber 6 underneath the lower plate 5, a second layer 7 of rubber between the two plates and a top layer 8 of rubber above the upper plate 4. The plates 4 and 5 have a plurality of relatively small holes therethrough so that the various layers or strata of rubber are connected by connecting elements 9 of rubber which extend through said holes. The plates are less in length and width than the length and width of the pad 2 so that at the outer edges of the pad there is a continuous covering 10 of rubber over the edges of the plates and at the sides and ends of the various layers 6, 7 and 8 of the rubber in the pad.

In manufacturing the pad a suitable mold 11 having a base and vertical sides is provided and at a number of places in the mold a series of vertical posts are used. These posts preferably are located at adjacent corners of the mold and each comprise three sections 12, 13 and 14. The section 12, nearest the bottom of the mold, is of the largest diameter while the others are of decreased diameters, the uppermost section 14 being of less diameter than the intermediate section 13. The rubber for the lower layer 6 is placed in the mold, the plate 5 is then located thereover and it has openings to pass over the upper and intermediate sections 13 and 14 of said posts to bring the plate to rest on the shoulders at the upper ends of the sections 12. The intermediate layer of rubber is then placed above the lower plate 5 and the plate 4 placed over the upper sections 14 of said posts whereby the second plate 4 is held on the shoulders at the upper ends of the sections 13. The final upper layer of rubber is then placed in the mold. It is well known that in vulcanizing rubber it is necessary to place the same under considerable pressure and of course actually when the mold is being filled with the rubber and the plates, the layers 6, 7 and 8 are thicker than in the finished pad and the plates 5 and 4 do not come into contact with the shoulders at the upper ends of the sections 12 and 13 of the posts until the mold has been closed and the rubber compressed therein. It is evident that with this method of constructing the rubber pads the plates are held in parallel relation to each other and parallel to the upper and lower sides of the pads.

If a plurality of bolts are used to attach the arms 2 of the motor vehicle to the chassis frame the same may pass through the openings which are made by reason of the mold posts extending through the pad. It is quite common, however, to use a single central opening through the pad and this is insured by using a central cylindrical post 15 with the mold, the plates having openings to pass over said post, so that the finished pad will have a central opening 16. The openings caused by the corner posts described are indicated at 17 and of course are not of uniform diameter throughout due to the different diameters of the sections of the post.

Figure 5:
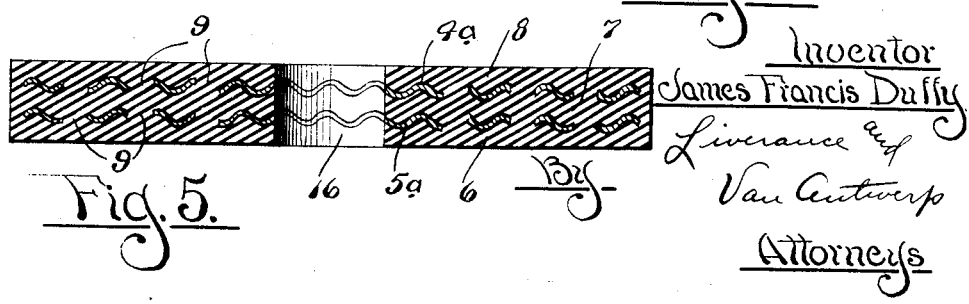
Fig. 5 is a longitudinal section through a modified form of construction of pad.

In Fig. 5 a slight modification in the structure is shown in that the metal plates 4a and 5a shown are not flat but are of corrugated form but the same openings are made therethrough both to join the layers of rubber and for spacing the plates and making the central opening 16.

The pad is disposed between the lower side of the engine arm 2 and the upper side of the channel 3 of the chassis frame. A bolt 18 passes through suitable openings in the arm and the upper web of the channel 3 and through the central opening 16 where one bolt only is used. The bolt is tightened and in practice a suitable fiber washer or other means of breaking the metal contact of the bolt with the arm 2 may be interposed between the head of the bolt and the upper side of the arm 2.

A pad of this character as before stated is resilient, stops the carrying of vibrations from the engine to the frame, does not become hard and non-resilient as it would if it was held at its side edges between sides of a retaining cup and does not flatten outwardly as would happen if the pad was of solid rubber block with no plates such as indicated at 4 and 5 embedded therein. The corrugated plates shown in Fig. 5 are even better than the flat plates in holding the layers of rubber against outward distortion and flattening down.

This construction of pad has proved especially satisfactory for vehicle engine mountings. It is of simple construction, readily manufactured and installed and is durable and serviceable for the life of motor vehicles in which used. The invention is defined in the appended claim and is to be considered comprehensive of all forms of structure coming within their scope.

I claim:

A process of manufacturing a motor pad or the like of the character described which consists in providing a mold having a rectangular shaped recess of the same size as the size of the finished article, placing uncured rubber in the recess to a predetermined and constant depth, next, placing a perforated reinforcing plate of less size than the recess upon the said uncured rubber, next placing another quantity of rubber upon the plate, then placing a second similar reinforcing plate upon the second quantity of rubber, next placing a third quantity of rubber upon the second reinforcing plate, then placing the top quantity of rubber under pressure, meanwhile providing stop means extending through the reinforcing plates near their corners whereby they are prevented from moving downwardly beyond predetermined points, also providing a post for extending through the respective layers of rubber and reinforcing plates, then vulcanizing the rubber and finally removing the said motor pad.

In testimony whereof I affix my signature.

JAMES FRANCIS DUFFY.